J. B. ENTZ.
AUTOMOBILE BODY.
APPLICATION FILED NOV. 20, 1913.
1,140,139.
Patented May 18, 1915.
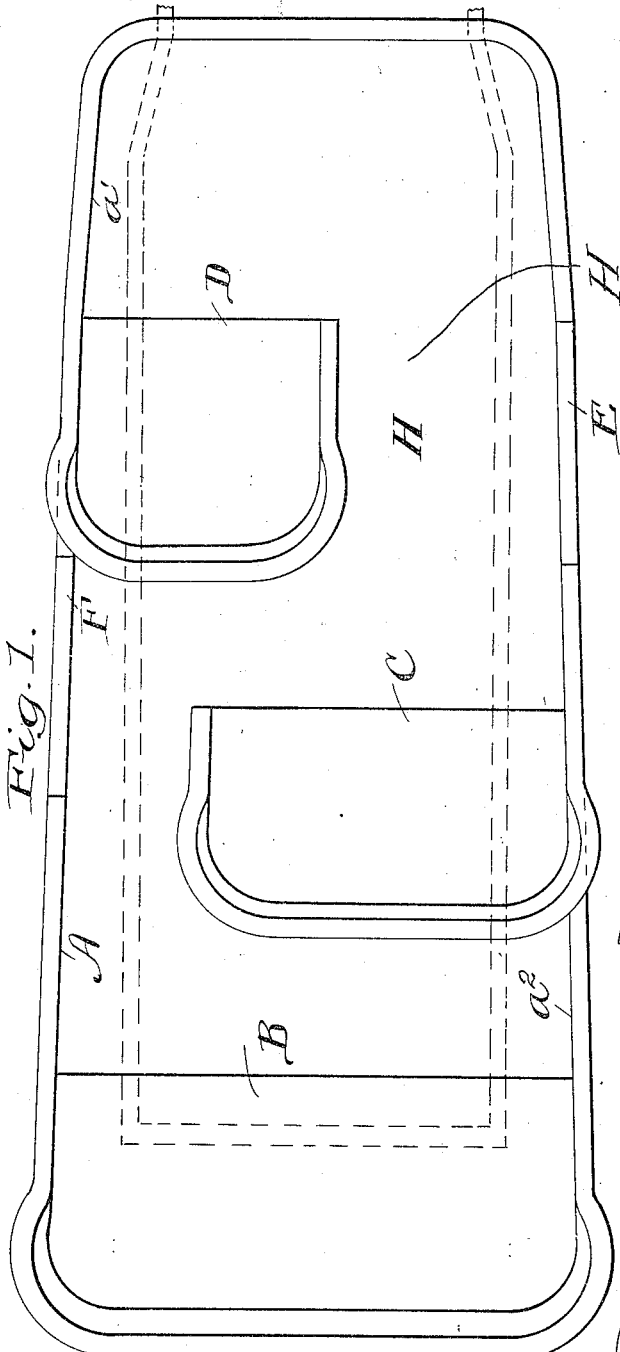
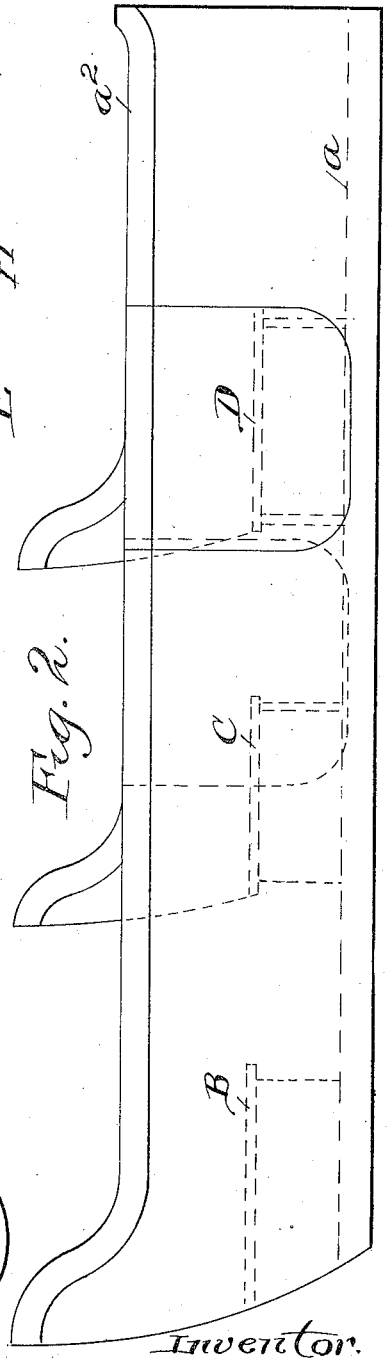

UNITED STATES PATENT OFFICE.

JUSTUS B. ENTZ, OF CLEVELAND, OHIO, ASSIGNOR TO THE WHITE COMPANY, OF CLEVELAND, OHIO, A CORPORATION OF OHIO.

AUTOMOBILE-BODY.

1,140,139.  Specification of Letters Patent.  Patented May 18, 1915.

Application filed November 20, 1913. Serial No. 802,013.

*To all whom it may concern:*

Be it known that I, JUSTUS B. ENTZ, a citizen of the United States, residing at Cleveland, in the county of Cuyahoga and State of Ohio, have invented a certain new and useful Improvement in Automobile-Bodies, of which the following is a full, clear, and exact description.

The object of this invention is to provide an automobile body of large carrying capacity which will be more comfortable and more convenient and which will weigh less for the required strength than the large automobile bodies which have heretofore been used.

The invention resides in the novel construction and arrangement of the seats and the door openings in the sides of the body relative to one another, as shown in the drawing and hereinafter described and pointed out in the claims.

In the drawings, Figure 1 is a plan view; and Fig. 2 is a side elevation of an automobile body constructed according to the present invention.

The body shell A, if so it may be termed, is or may be of any ordinary construction, except for the location of the door openings relative to one another and except for the fact that, because the door openings are not placed opposite one another, as is commonly the case, smaller side sills $a$ may be used than has heretofore been required to build the body of the required strength.

At the rear end of the body is a seat B extending from side to side, as is the usual practice. In front of this seat, and at a sufficient distance therefrom to give the required foot and leg room between them is a permanently placed intermediate seat C, which, in a body designed for a left hand driving car, will extend from the right side of the body over toward, but not to the left side thereof,—sufficient space being left between the left end of the seat and the left side of the body to serve as an aisle G through which the passengers may pass from one part of the body to the other. Nearer the front of the car is the driver's seat D, which, in a left hand drive car, extends from the left side about half way across the body, thereby leaving between the right end of the seat and the right side of the body a wide aisle H through which passengers may conveniently pass.

In the right side of the car transversely in line with the driver's seat is a door opening closable by door E. This door opening and door are located quite a bit back of the position usually occupied by the so-called fore door of a touring car body,—the usual position being wholly in front of the driver's seat. By carrying this opening rearward, as it is in the body as shown, space is left outside of the body and in front of said door in which a spare tire may be carried so that it will not interfere with the use of said door. In the opposite side of the car just behind the driver's single seat is another opening closed by a door F.

A car with the seats and doors constructed and arranged as shown and described, while very convenient for general use, is particularly adapted for touring purposes. When touring there will be in the car usually two persons capable of driving it, commonly a hired chauffeur and the owner. These can exchange places at any time without having to get out of the car to do it. A person may get into the car from either side thereof, and, when in, may go to any seat. In the ordinary construction, as heretofore used, two folding seats of some specific construction or another, have been located between the rear seat and the driver's seat, and on opposite sides of the car. The exigencies of construction to make them folding seats, render it impossible to make these seats very comfortable. They usually have to be folded up, one or both of them, to allow passengers to get into or out of the body. But with a seat arranged as seat C is arranged, it may be nicely upholstered and made very comfortable. It occupies a part of the body which is as little subject to vibration as any. The absence of a seat alongside of the driver's seat accomplishes several useful purposes, to wit, (*a*) it leaves an absolutely unobstructed forward view for one of the passengers sitting in seat C, and a nearly unobstructed view for the other passenger sitting in said seat; and (*b*) the space in the front end of the body which would ordinarily be required for foot room, if there were a seat alongside of the driver's seat is available for carrying luggage. Luggage in this place is out of the way,—that is to say, it is not under foot, as it always is in touring car bodies as they have heretofore been made. Moreover, when doors in opposite sides of the car are not located one directly opposite the other, but are offset as shown, the body is not weakened to the extent that it is weakened by doors placed directly opposite one another. Therefore in constructing a body in the manner shown and heretofore described, it is possible to get a body with the required strength, without having to use anywhere near as heavy side sills as heretofore have been required.

Having thus described my invention, what I claim is:

1. An automobile body having a rear seat, a single driver's seat extending from one side of the body part way across the same, and an intermediate seat located behind the driver's seat and extending from the opposite side of the body part way only across said body,—thereby leaving an aisle between the driver's seat and one side of the car, and another aisle between the intermediate seat and the other side of the car, the opposite sides of the body having each one door opening,—which doors are located one in advance of the other, one communicating with the aisle by the side of the driver's seat, and the other with the aisle by the side of the intermediate seat.

2. An automobile body having through each side one door opening only, which two door openings are not located oppositely but are located one in advance of the other, a rear seat extending from one side of the body to the other, a driver's seat located just in front of one of the door openings and transversely in line with the other door opening, which driver's seat extends from the first named side part way only across the body, and an intermediate seat located behind the last mentioned door opening and extending from the side in which that door opening is located part way only across the body toward the other side thereof.

In testimony whereof, I hereunto affix my signature in the presence of two witnesses.

JUSTUS B. ENTZ.

Witnesses:
E. L. THURSTON,
L. I. PORTER.